United States Patent Office 3,803,304
Patented Apr. 9, 1974

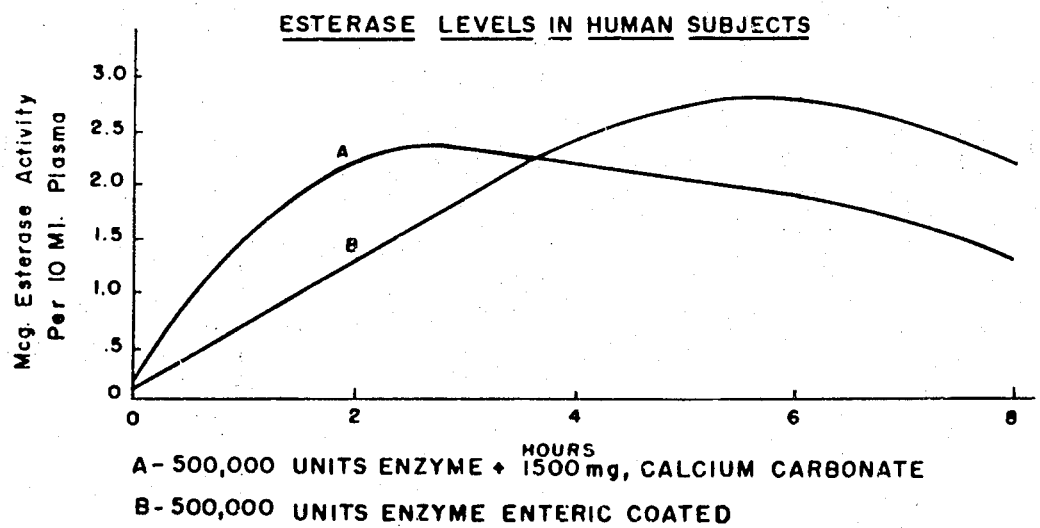

3,803,304
ORALLY ADMINISTRATABLE PANCREATIC
ENZYMES AND METHODS OF USING SAME
Harold J. Antonides, Kankakee, Ill., assignor to Armour Pharmaceutical Company, Chicago, Ill.
Continuation-in-part of abandoned application Ser. No. 472,791, July 19, 1965. This application Mar. 26, 1970, Ser. No. 23,042
Int. Cl. A61k 19/00
U.S. Cl. 424—94
4 Claims

ABSTRACT OF THE DISCLOSURE

Methods and preparations for orally administering pancreatic enzymes to a host whereby said enzymes are capable of resisting inactivation by the gastric fluids and intestinal fluids of the host to whom it is orally administered while obtaining, within said host, a prompt and effective systemic release of said enzymes.

---

This application is a continuation-in-part of my co-pending application Ser. No. 472,791, filed July 19, 1965, now abandoned.

This invention relates to methods and pharmaceutically effective preparations for orally administering enzymes of pancreatic origin to a host in need of enzyme therapy. The pancreatic enzyme preparation of the present invention is capable of resisting inactivation by the gastric and intestinal fluids of the host to whom it is administered while obtaining within said host a more rapid enzyme effect after administration than is obtainable by the administration to the host of an enterically coated preparation of like enzyme content.

The rapid inactivation of enzymes of pancreatic origin by gastric fluid is well recognized, and the use of enteric coatings to protect the enzymes from gastric fluid has been regarded as mandatory. Unfortunately, the use of enteric coatings for protecting the enzymes from such inactivation also delays the action of the enzymes in the intestines. Further, as pointed out by Avakian, New England Journal of Medicine 264, 764 (1961) and Jenkins, Clinical Medicine 8, 1929 (1961), the pancreatic enzymes are also inactivated by intestinal fluids. Hence, there is not only a delay in the effective action of the enzymes within the intestinal tract, but also a rapid loss of enzyme activity within the tract by contact with the intestinal fluids.

I have discovered that by combining the enzymes with certain compounds, herein characterized as "controlled buffering materials," the enzymes can be protected against inactivation by the gastric fluid and by the intestinal fluid while at the same time providing a more rapid onset of the enzyme action within the host thereby producing a superior therapeutic effect. Further, there is a reduction in cost-per-dose compared to enteric coated tablets, greater latitude in obtaining a concurrent release of enzymes and coadministered medicaments, not required to be enteric coated, and a more prompt attainment of desired enzyme blood levels.

A primary object of the present invention is to provide a composition effective to permit enzymes of pancreatic origin contained therein to resist inactivation by the digestive fluids of the host to whom the composition is administered.

A further object of the present invention is to provide resistance to pancreatic enzymes, such as trypsin, chymotrypsin, and mixtures thereof, against inactivation by the gastric and intestinal fluids of the host to whom they are administered.

A still further object of the present invention is to provide a pharmaceutical preparation and method which obtains a more rapid onset of action by enzymes of pancreatic origin in the stomach and intestinal tract through the use of buffering materials which resist inactivation while permitting rapid attainment of enzyme blood levels in the host to whom it is administered.

These and still further objects, as shall hereinafter appear, are fulfilled by the present invention in a remarkably unobvious fashion as will be readily discerned from the following detailed description of certain exemplary embodiments of this invention.

In one embodiment of the invention, the enzyme of pancreatic origin is combined directly with one or more of buffer materials to provide a preparation useful for oral administration. Various methods for achieving such combinations may be used. For instance, the buffer material may be combined directly with the enzyme and the resulting mixture compressed into tablet form using suitable excipients; or a table may be formed by press coating buffer material about a core of enzyme, or a multi-layered tablet may be formed. By any of these methods, a product is formed which is easily administered orally to a desired host. It is found that the buffer material provides a marked effect resulting in the retention of from about 80 to 90 percent of the theoretical activity of the enzyme at the end of two hours' contact with the gastric fluid. This is significant resistance to deactivation. Further, there is marked protection of the enzymes within the intestinal tract against inactivation by the intestinal fluids.

In general, I have found that the buffer material may be chosen from a group hereinafter defined of therapeutically acceptable material which when combined with the enzyme and administered orally maintains the pH of the gastric fluid within the range of about 4–7 pH. Buffering materials which have been found effective in the practice of this invention are calcium carbonate, magnesium carbonate, dicalcium phosphate, disodium phosphate, sodium citrate, and sodium bicarbonate.

Best results have been obtained by combining the enzyme with calcium carbonate which is economical, highly efficient, therapeutically acceptable, and which has the property of being self-limiting in terms of pH. Even in the intestinal tract where pH is no longer a factor, it is found that the named buffering materials protect the enzyme from inactivation by the intestinal fluid.

Sodium bicarbonate is also inexpensive and may be employed when, for other reasons, the use of calcium carbonate is contraindicated.

Materials which were examined and found not to perform in the manner of my listed buffering materials are calcium chloride and citric acid.

The proteolytic enzymes of pancreatic origin which are found to be most useful are trypsin and chymotrypsin or mixtures thereof. I prefer to employ mixtures of trypsin and chymotrypsin as they are found in the bovine and porcine sources.

The dosage is not critical and the common dosage of 25,000 to 400,000 Armour units now employed for various therapeutic purposes may be used. For example, trypsin and/or chymotrypsin providing 50,000 Armour units (50,000 BAEE and/or ATEE units) may be combined with 250 mg. of calcium carbonate to provide a typical oral tablet product.

The product may be employed in other dosage forms than enteric tablets, e.g., uncoated tablets, capsules, powders, etc. The enzymes may be released concurrently with coadministered medicaments of the type not requiring enteric coatings.

In the drawing, FIG. 1 sets out a graph showing the efficacy of an enzyme-buffer mixture in comparison to an enteric coated enzyme when administered orally to human subjects. Curve A represents the esterase activity produced in the blood by a composition consisting of 500,000 units of enzyme+1500 mg. of calcium carbonate, the enzyme being a naturally-occurring mixture of trypsin and chymotrypsin. Curve B represents the activity produced by a composition consisting of 500,000 units of the same type enzyme mixture enteric coated. It will be observed that composition A gives a more rapid elevation of the esterase blood level, thus producing in 3¾ hours a superior therapeutic effect above that produced by the enteric coated composition.

Specific examples illustrative of the invention may be set out as follows:

EXAMPLE I

Simulated gastric fluid (as described in U.S.P. XVI) was adjusted with sodium hydroxide to the pH shown in the following table, and the stability of chymotrypsin tested therein under the conditions set out in the table. The percent activity retained was measured by ATEE (acetyl tyrosine ethyl ester) substrate assay on bovine chymotrypsin 25,000 units in 20 ml. of gastric fluid at 37° C.

TABLE 1.—CHYMOTRYPSIN STABILITY IN GASTRIC FLUID AT VARIOUS pH's AS PERCENT ACTIVITY RETAINED

| pH of gastric fluid | Initial, percent | Assay interval of — | | | |
|---|---|---|---|---|---|
| | | 15' | 30' | 60' | 120' |
| | | Percent | | | |
| pH | 12 | 3 | 1 | 0 | 0 |
| pH 2.00 | 61 | 3 | 0 | 0 | 0 |
| pH 4.00 | 99 | 92 | 100 | 100 | 92 |
| pH 6.00 | 100 | 100 | 100 | 100 | 100 |
| pH 8.00 | 74 | 67 | 68 | 71 | 56 |

EXAMPLE II

The tests were made as described in Example I in simulated gastric fluid (U.S.P. XVI) adjusted with sodium hydroxide to the pH shown, but instead of chymotrypsin, trypsin was introduced into the gastric fluid. The percent activity retained was measured by BAEE (benzoyl arginine ethyl ester) substrate assay on bovine trypsin 50,000 units in 20 ml. of gastric fluid at 37° C.

TABLE 2.—TRYPSIN STABILITY IN GASTRIC FLUID AT VARIOUS pH's AS PERCENT ACTIVITY RETAINED

| pH of gastric fluid | Initial, percent | Assay interval of— | | | |
|---|---|---|---|---|---|
| | | 15' | 30' | 60' | 120' |
| | | Percent | | | |
| pH 1.20 | 64 | 1 | 0 | 0 | 0 |
| pH 2.00 | 81 | 7 | 1 | 0 | 0 |
| pH 4.00 | 99 | 96 | 93 | 89 | 81 |
| pH 6.00 | 95 | 93 | 78 | 63 | 47 |
| pH 8.00 | 95 | 59 | 44 | 28 | 20 |

EXAMPLE III

The stability of chymotrypsin in gastric fluid in the presence of various salt buffers was determined, the percent activity retained being measured by ATEE substrate assay on bovine chymotrypsin 25,000 units in 20 ml. of simulated gastric fluid at 37° C. The simulated gastric fluid (U.S.P. XVI) at pH 1.20 assumes an altered pH in the presence of salts. The results are set out in Table 3.

TABLE 3.—CHYMOTRYPSIN STABILITY IN GASTRIC FLUID IN THE PRESENCE OF VARIOUS SALTS AS PERCENT ACTIVITY RETAINED

| Salt present | pH produced | Initial, percent | Assay interval of— | | | |
|---|---|---|---|---|---|---|
| | | | 15' | 30' | 60' | 120' |
| | | | Percent | | | |
| None | 1.20 | 12 | 3 | 1 | 0 | 0 |
| Calcium carbonate, 250 mg | 6.50 | | 93 | 100 | 98 | 90 |
| Calcium acetate, 278 mg.ᵃ | 4.60 | 92 | 100 | 100 | 98 | 98 |
| Dicalcium phosphate, 248 mg.ᵃ | 3.95 | 100 | 97 | 88 | 88 | 91 |
| Calcium chloride, 340 mg.ᵃ | 1.30 | 8 | 4 | 2 | 0 | 0 |
| Sodium bicarbonate, 270 mg | 7.50 | 75 | 79 | 76 | 68 | 56 |

ᵃ Calcium ion concentration equivalent to calcium carbonate, 250 mg.

EXAMPLE IV

The chymotrypsin-trypsin mixture was tested as to stability in gastric fluid in the presence of various salts, the percent activity retained being measured by ATEE and BAEE substrate assays on porcine chymotrypsin-trypsin mixture 50,000 units in 20 ml. of simulated gastric fluid at 37° C. The simulated gastric fluid (U.S.P. XVI) at pH 1.20 assumes an altered pH in the presence of salts. The results are set out in the following table:

TABLE 4.—CHYMOTRYPSIN-TRYPSIN MIXTURE STABILITY IN GASTRIC FLUID IN THE PRESENCE OF VARIOUS SALTS AS PERCENT ACTIVITY RETAINED

| Salt present | pH produced | Initial, percent | Assay interval of— | | | |
|---|---|---|---|---|---|---|
| | | | 15' | 30' | 60' | 120' |
| | | | Percent | | | |
| None | 1.20 | | | | | |
| Chymotrypsin activity | | 64 | 1 | 1 | 0 | 0 |
| Trypsin activity | | 60 | 0 | 0 | 0 | 0 |
| Calcium carbonate, 250 mg | 6.55 | | | | | |
| Chymotrypsin activity | | 100 | 100 | 100 | 78 | 84 |
| Trypsin activity | | 85 | 88 | 83 | 87 | 91 |
| Dicalcium phosphate, 250 mg | 3.00 | | | | | |
| Chymotrypsin activity | | 88 | 69 | 65 | 49 | 34 |
| Trypsin activity | | 65 | 35 | 10 | 7 | 0 |
| Magnesium carbonate, 125 mg | 7.90 | | | | | |
| Chymotrypsin activity | | 62 | 65 | 62 | 55 | 46 |
| Trypsin activity | | 74 | 71 | 70 | 61 | 52 |
| Sodium bicarbonate, 200 mg | 7.25 | | | | | |
| Chymotrypsin activity | | 77 | 68 | 68 | 69 | 63 |
| Trypsin activity | | 80 | 74 | 71 | 69 | 57 |
| Sodium citrate, 250 mg | 3.75 | | | | | |
| Chymotrypsin activity | | 57 | 57 | 54 | 52 | 52 |
| Trypsin activity | | 52 | 47 | 41 | 31 | 22 |
| Disodium phosphate, 250 mg | 5.60 | | | | | |
| Chymotrypsin activity | | 36 | 32 | 43 | 41 | 40 |
| Trypsin activity | | 49 | 41 | 41 | 36 | 33 |
| Citric acid, 250 mg | 1.20 | | | | | |
| Chymotrypsin activity | | 61 | 1 | 1 | 0 | 0 |
| Trypsin activity | | 54 | 0 | 0 | 0 | 0 |

EXAMPLE V

The stabilizing effect of calcium carbonate on enzymes measured by percent enzyme activity retained while in digestive fluids was determined as set out in Table 5 below. The percent enzyme activity retained was measured by ATEE and BAEE substrate assays upon the enzymes in 20 ml. of digestive fluid at 37° C.

the mixture into slugs, granulate the slugs. Compress the granulation into tablets approximately 9/32" in diameter.

TABLE 5

|  | Porcine chymotrypsin mixture | Porcine chymotrypsin mixture plus cal. carb. | Bovine chymotrypsin mixture | Bovine chymotrypsin mixture cal. plus carb. | Bovine chymotrypsin | Bovine chymotrypsin plus cal. carb. | Bovine trypsin | Bovine trypsin plus cal. carb. |
|---|---|---|---|---|---|---|---|---|
| (A) Gastric fluids:[a] | | | | | | | | |
| (1) Chymotrypsin activity (ATEE substrate): | | | | | | | | |
| Initial assay | 52–80 | 100 | 16–67 | 80–88 | 12–35 | 84 | | |
| 15' | 2–3 | 100 | 4–10 | 85–100 | 3 | 86–93 | | |
| 30' | 0 | 100 | 0–2 | 82–88 | 1 | 88–100 | | |
| 60' | 0 | 78–100 | 0 | 82–86 | 0 | 81–98 | | |
| 120' | 0 | 84–100 | 0 | 83–88 | 0 | 86–90 | | |
| (2) Trypsin activity (BAEE substrate): | | | | | | | | |
| Initial assay | 64–75 | 85–90 | 26–65 | 80–87 | | | 64–70 | 89–97 |
| 15' | 0–1 | 87–88 | 0–3 | 81–82 | | | 1 | 83–89 |
| 30' | 0 | 83–85 | 0 | 77–79 | | | 0 | 79–89 |
| 60' | 0 | 78–87 | 0 | 69–76 | | | 0 | 78–75 |
| 120' | 0 | 77–91 | 0 | 68–71 | | | 0 | 65–71 |
| (B) Intestinal fluid:[b] | | | | | | | | |
| (1) Chymotrypsin activity (ATEE substrate): | | | | | | | | |
| Initial assay | 86 | 100 | 100 | 88 | 95 | 93 | | |
| 15' | 67 | 97 | 58 | 81 | 50 | 70 | | |
| 30' | 65 | 100 | 38 | 60 | 20 | 52 | | |
| 60' | 63 | 92 | 12 | 46 | 2 | 28 | | |
| 120' | 35 | 82 | 4 | 35 | 0 | 10 | | |
| (2) Trypsin acitvity (BAEE substrate): | | | | | | | | |
| Initial assay | 93 | 88 | 78 | 72 | | | 64 | 64 |
| 15' | 46 | 76 | 15 | 43 | | | 8 | 30 |
| 30' | 24 | 64 | 5 | 27 | | | 4 | 21 |
| 60' | 10 | 46 | 2 | 16 | | | 2 | 12 |
| 120' | 5 | 28 | 1 | 9 | | | 1 | 6 |

[a] Simulated gastric fluid U.S.P. XVI at pH 1.20 and human gastric fluid at pH 2.10.
[b] Simulated intestinal fluid U.S.P. XVI at pH 7.50.

EXAMPLE VI

The in vivo demonstration of the utility of my discovery has been provided by tests upon humans. The elevation of the circulating blood esterase values was demonstrated following oral administration of a calcium carbonate buffered trypsin-chymotrypsin enzyme mixture. The buffered enzymes were administered orally in a capsule to volunteers, with blood samples being taken from the volunteers at zero time and at 2, 4, 6 and 8 hours post administration. The volunteers were allowed no breakfast but as much lunch as the individuals desired following the 4-hour sample. The results are set out below and in comparison with results obtained by the use of the same enzyme dosage where the enzymes were enteric coated. The rapid onset of action of the buffered enzymes is further presented in the drawing of a graph, FIG. 1.

It may be observed that the blood esterase level increases more rapidly from administration of the buffered enzyme than from administration of enteric coated enzyme. The peak blood levels occur at 2 hours for buffered and at 6 hours for enteric protected enzymes. Computation of the areas under the curves shows that the area of enzyme with buffer is 95% of that of the enteric coated enzyme, indicating a comparable effect.

TABLE 6.—ESTERASE ACTIVITY [a] IN HUMAN SERUM

|  | Hours following administration | | | | |
|---|---|---|---|---|---|
|  | 0 | 2 | 4 | 6 | 8 |
| 500,000 units enzymes plus 1,500 mg. calcium carbonate | 0.2 | 2.2 | 2.2 | 1.9 | 1.3 |
| 500,000 units enzymes, enteric coated | 0 | 1.3 | 2.4 | 2.8 | 2.2 |

[a] Mean values determined upon 5–6 subjects using equivalent dosage. Values expressed as mcg. activity per 10 ml. of serum.

EXAMPLE VII

| | Per tablet |
|---|---|
| Trypsin-chymotrypsin mixture | 50,000 Units (approx. 20 mg.) |
| Calcium carbonate | 250 Mg. |
| Polyvinylpyrrolidone | 3 Mg. |
| Magnesium stearate | 3 Mg. |
| Lactose, approximately | 24 Mg. |
| To make | 300 Mg. |

Combine the calcium carbonate with a solution of polyvinylpyrrolidone in alcohol and dry the mixture. Combine the calcium carbonate-polyvinylpyrrolidone mixture with the enzyme, magnesium stearate and lactose. Compress

EXAMPLE VIII

| | Per tablet, mg. |
|---|---|
| Trypsin, 50,000 units (approx.) | 17 |
| Calcium carbonate | 250 |
| Polyvinylpyrrolidone | 3 |
| Magnesium stearate | 3 |
| Lactose, approx. | 27 |
| To make | 300 |

Prepare the tablets according to the procedure of Example VII.

EXAMPLE IX

| | mg. |
|---|---|
| Chymotrypsin, 25,000 units (approx.) | 20 |
| Calcium carbonate | 250 |
| Polyvinylpyrrolidone | 3 |
| Magnesium stearate | 3 |
| Lactose, approx. | 24 |
| To make | 300 |

Prepare the tablets according to the procedure of Example VII.

EXAMPLE X

| | mg. |
|---|---|
| Trypsin-chymotrypsin mixture, 50,000 units (approx.) | 20 |
| Sodium bicarbonate | 200 |
| Polyvinylpyrrolidone | 2.5 |
| Magnesium stearate | 2.5 |
| Lactose, approx. | 24 |
| To make | 250 |

Prepare the tablets according to the procedure of Example VII.

EXAMPLE XI

| | Mg. |
|---|---|
| Pancreatin 5x N.F. | 100 |
| Calcium carbonate | 250 |
| Polyvinylpyrollidone | 4 |
| Magnesium stearate | 4 |
| Lactose | 42 |
| To Make | 400 |

Prepare the tablets according to the procedure of Example VII.

While I prefer to have the buffering agent combined with the enzyme in a tablet or other dosage form, it will be understood that the desirable effects may be obtained by concurrent administration of a buffering agent to condition the digestive fluids to prevent inactivation of the pancreatic enzymes. For example, the calcium carbonate, sodium bicarbonate, etc., could be administered prior to the uncoated plain enzyme tablet to achieve the desired effect, the administration being a co-administration of the buffer and enzyme.

I shall now describe an exemplary practice of the therapeutic method of my invention whereby systemic enzyme effect is readily and promptly obtained without the use of enteric coatings. I administer to a host requiring enzyme therapy, enzymes of pancreatic origin selected from the group consisting of trypsin, chymotrypsin and mixtures thereof while the pH of the gastric fluids of the host are maintained within the range of about 4–7 as a result of the oral administration of a buffering material selected from the group consisting of calcium carbonate, magnesium carbonate, dicalcium phosphate, disodium phosphate, sodium citrate and sodium bicarbonate.

In a preferred practice, an appropriate amount of the buffering material, that is, the amount needed to establish the prescribed pH range in the gastric fluids, is admixed in a single tablet with the pancreatic enzyme to provide simultaneous rather than sequential administration. An equally efficacious alternative dosage form comprises an enzyme core surrounded by compacted buffering material although it is understood that the surrounding of the core is not critical to obtaining the remarkable benefits described. A still further dosage form is created by disposing a layer of buffer material upon a layer containing the enzyme and a suitable excipient.

While I have described specific methods and preparations in detail to provide exemplary embodiments of the invention, it is, of course, understood that such modifications, alterations or adaptations as may readily occur to the skilled artisan confronted with this disclosure are intended within its spirit, especially as it is defined by the scope of the claims appended hereto.

I claim:

1. An orally administrable pharmaceutical preparation capable of a rapid systemic enzyme effect after oral administration consisting essentially of an enzyme selected from the group consisting of trypsin, chymotrypsin and mixtures thereof, and a buffering agent selected from the group consisting of calcium carbonate, magnesium carbonate, dicalcium phosphate, disodium phosphate, sodium citrate and sodium bicarbonate, in an amount sufficient to maintain the pH of gastric fluids in the range of 4–7 and thereby protect said enzyme from inactivation by the gastric fluids.

2. A preparation according to claim 1 in which said enzyme comprises a mixture of chymotrypsin and trypsin, and said buffering agent comprises at least 250 mg. of calcium carbonate, said chymotrypsin-trypsin mixture providing at least about 25,000 Armour units of enzyme activity.

3. The method of orally administering to a host a therapeutically effective dose of enzymes of pancreatic origin without using enterically coatings comprising administering orally to said host the preparation of claim 1.

4. The method of claim 3 in which said host is administered a preparation according to claim 2.

References Cited

UNITED STATES PATENTS

| | | | |
|---|---|---|---|
| 2,930,736 | 3/1960 | Sullivan et al. | 424—94 |
| 3,063,911 | 11/1962 | Tanaka et al | 424—94 |
| 3,325,364 | 6/1967 | Merritt et al. | 424—94 |
| 3,329,564 | 7/1967 | Aguiar et al. | 424—94 |

OTHER REFERENCES

Muller et al. Arch. Biochem. & Biophys. (1958), Vol. 76, pages 328–341

SAM ROSEN, Primary Examiner